May 8, 1962    H. M. McKAY    3,033,522
LANDING GEAR FOR TRAILERS
Filed March 13, 1959    2 Sheets-Sheet 1
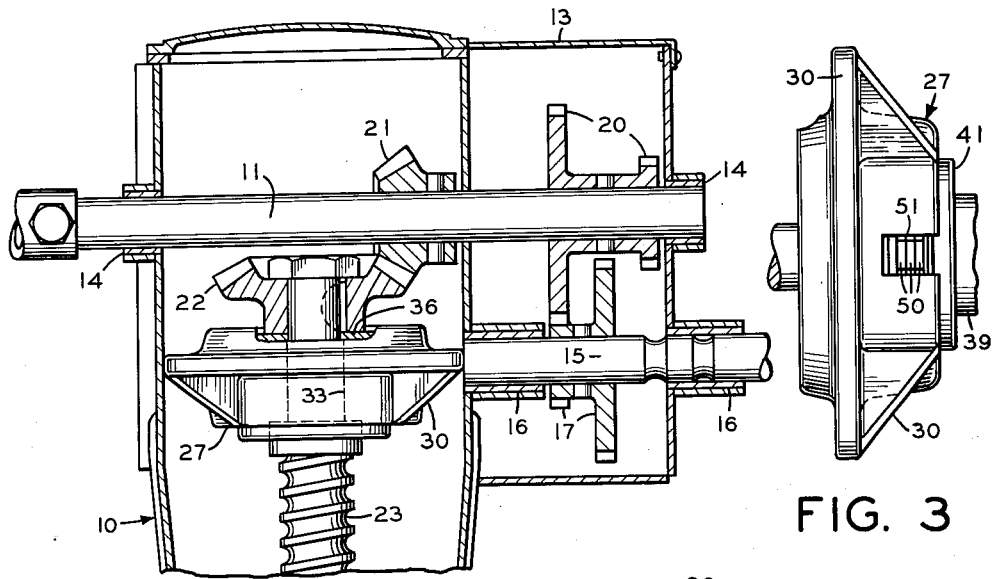
FIG. 1
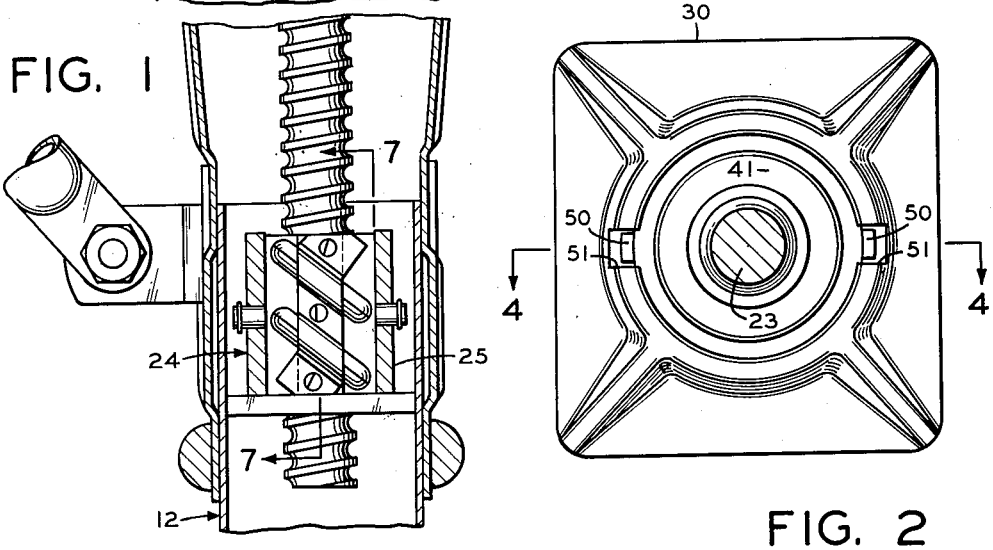
FIG. 3
FIG. 2
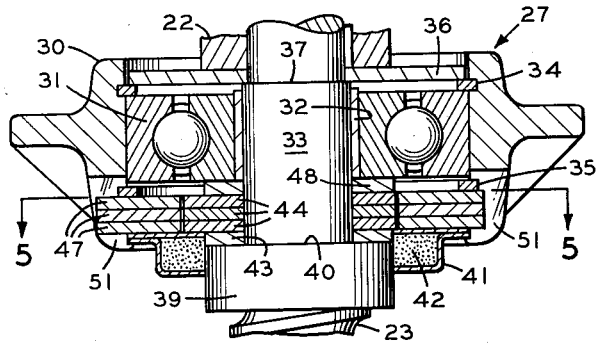
FIG. 4
INVENTOR.
HARRY M. McKAY
BY Cohn and Powell
ATTORNEYS May 8, 1962 H. M. McKAY 3,033,522
LANDING GEAR FOR TRAILERS
Filed March 13, 1959 2 Sheets-Sheet 2

INVENTOR.
HARRY M. McKAY
BY
Cohn and Powell
ATTORNEYS

United States Patent Office 3,033,522
Patented May 8, 1962

3,033,522
LANDING GEAR FOR TRAILERS
Harry M. McKay, Warrenton, Mo., assignor to Binkley Mfg. Company, Warrenton, Mo., a corporation of Missouri
Filed Mar. 13, 1959, Ser. No. 799,353
5 Claims. (Cl. 254—86)

This invention relates generally to improvements in landing gear for trailers, and more particularly to an improved locking mechanism adapted to control the extension and retention of telescopically connected leg sections.

It is an important object to provide a landing gear that is adapted to lock automatically when torque is released from the screw operatively interconnecting the telescopically releated leg sections so as to preclude unintentional extension of such gear.

Yet another important objective is achieved by the provision of friction means on the screw that seats and engages a fixed element on one leg section to support the other leg section, and hence acts to prevents such unintentional extension. Other advantages are achieved in that means are provided for permissively turning the screw under a torque greater than the friction means can resist in order to extend the leg sections.

Another important object is to provide a lock mechanism that operates automatically to prevent unintentional turning of the screw and hence retraction of the leg sections when load pressure is exerted on the landing gear.

Still another important objective is achieved by the provision of a pawl loosely mounted on the screw, a brake plate about the pawl, and friction means on the screw clampingly engaging the pawl upon application of load pressure so that the pawl operatively engages the brake plate to prevent retraction of the gear.

Other important advantages are realized by means for applying a turning force to the screw greater than the last mentioned friction means can resist so that the friction means slips on the pawl to enable selectively retraction of the leg sections.

Another important object is afforded by the mounting of the brake plate in the one leg section so as to preclude rotation yet permit lateral shifting of such brake plate, and by the construction of the pawl so as to engage the brake plate to lock the screw in one direction and to shift the brake plate laterally to permit turning of the screw in the opposite direction.

Another important object is to provide a landing gear that is simple and durable in construction, efficient in operation, economical to manufacture, and which is automatic in its locking action.

The foregoing and numerous other objects and advantages of the invention will more clearly appear from the following detailed description of a preferred embodiment, particularly when considered in connection with the accompanying drawings, in which:

FIG. 1 is a cross sectional view of the landing gear taken taken along a vertical plane passed through its longitudinal axis;

FIG. 2 is a bottom plan view of the lock mechanism housing shown in FIG. 1;

FIG. 3 is a side elevational view of the housing illustrated in FIG. 2;

FIG. 4 is a cross sectional view of the lock mechanism as seen along line 4—4 of FIG. 2;

Figure 5:
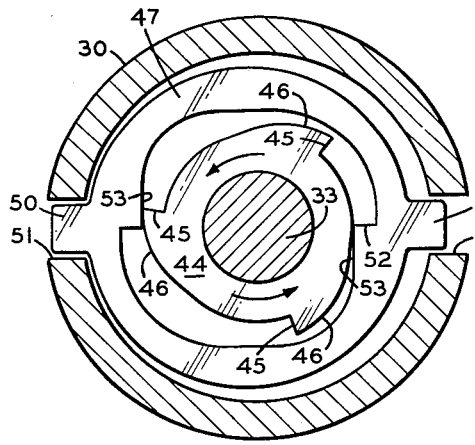
FIG. 5 is a cross sectional view of the lock mechanism as seen along line 5—5 of FIG. 4, the position of the component parts being shown as the screw is turned in one direction.

Referring now by characters of reference to the drawings, and first to FIG. 1, it is seen that the landing gear includes a first leg section generally indicated at 10 which is mounted on and pivotally connected to a transverse shaft 11. Telescopically connected to leg section 10 is an extensible leg section referred to at 12, preferably located internally of leg section 10. The extensible leg section 12 closely interfits the internal wall of leg section 10. In the preferred structure, the leg sections 10 and 12 are substantially square in cross section in the areas in which such leg sections interfit so as to prevent relative rotation.

A ground foot or wheel (not shown) is usually attached to the bottom of the extensible leg section 12, but is not disclosed because it is a conventional structure and forms no part of the invention.

A housing 13 is attached to the side of leg section 10 to provide an enclosure for the drive gear train. The cross shaft 11 is rotatively mounted in bearings 14 formed on leg section 10 and on housing 13. Drive shaft 15 is journalled in bearings 16 formed on housing 13. A crank (not shown) is adapted to be attached to drive shaft 15 to rotate the shaft incident to operation of the landing gear.

Drive gears 17 are keyed to shaft 15 and are adapted to mesh selectively with the driven gears keyed to the cross shaft 11. The gears 17 and 20 are located within housing 13. If it is desired to change the drive ratio, the drive shaft 15 may be pulled outwardly to the right of FIG. 1 so that the other coacting pair of drive and driven gears intermesh.

Fixedly attached to cross shaft 11 and located within the leg section 10 is a bevel gear 21 that intermeshes with a coacting bevel gear 22 keyed to the top of actuating screw 23. The screw 23 operatively interconnects the leg sections 10 and 12 so as to extend and retract the extensible leg section 12.

A continuous ball bearing generally indicated at 24 has its housing 25 fixed to the extensible leg section 12 by a plurality of brackets 26 so as to prevent relative rotation of the bearing housing 25 and the leg section 12. As is well known in the bearing art, and is illustrated clearly in FIGS. 1 and 7–9 inclusive, the bearing 24 provides a continuous race of ball bearings adapted to engage the spiral groove provided in the screw 23. Because of the particular structure of this type of ball bearing 24, there is very little friction between the screw 23 and the bearing 24. It is apparent that upon rotation of the screw 23, the bearing 24 is movable down or up depending upon the direction of rotation, whereby to cause extension and retraction of the leg section 12.

The lock mechanism generally referred to at 27 (FIG. 1) is located within the pivoted leg section 10. The lock mechanism 27 includes a housing 30 that is fixed to the inside wall of pivoted leg section 10. The screw 23 extends upwardly through the center of housing 30. The internal mechanism of the lock is best shown in FIG. 4.

Located within the housing 30 is a ball-race bearing 31 having one part attached to housing 30 and the other part attached to a sleeve 32 located about shaft portion 33 of screw 23. A snap ring 34 is fixed in an internal groove formed in housing 30 located immediately above the ball bearing 31, the snap ring 34 preventing upward movement of the bearing 31. Another snap ring 35 is similarly located in an annular groove formed internally of housing 30 and engages the lower side of bearing 31 to prevent downward movement of such bearing.

An "up-lock" washer or plate 36 constituting a friction means is mounted loosely on the shaft portion 33, and is located and held between a shoulder 37 on the screw shaft 33 and the lower end of bevel gear 22. The friction plate 36 seats on top of the snap ring 34. Thus it is seen that the snap ring 34 supports the entire weight of the bevel gear 22, screw 23 and the extensible leg section 12.

When the leg section 12 is in retracted position, the entire weight of the leg section 12, screw 23 and bevel gear 22 is supported on the snap ring 34, creating considerable frictional force between the snap ring 34 and the friction plate 36. The frictional force applied by friction plate 36 prevents casual or unintentional rotation of the friction plate 36 and of the screw 23, and hence prevents extension of the leg section 12.

The screw 23 includes a collar 39 that provides an upwardly facing shoulder 40. A grease retainer 41 is fixed to the housing 30 and extends downwardly closely contiguous with the collar 39. A felt washer 42 is held by the grease retainer 41. Seated on the shoulder 40 of collar 39 is a "down-lock" washer 43 preferably made of brass material, the washer 43 constituting a friction means.

Mounted loosely on the screw shaft portion 33 within the housing 30 are a plurality of pawls 44. In the embodiment illustrated three pawls 44 are used. A spacer washer 48 is located about the screw shaft portion 33 and located between the pawls 44 and the lower side of bearing 31. As is seen best in FIG. 4, the pawls 44 are located between the friction washer 43 and the fixed spacer washer 48. While there is no direct attachment between these elements, the pawls 44 frictionally engage the friction washer 43.

From FIG. 5 it is seen that each pawl 44 includes a plurality of peripherally spaced stop abutments 45 facing in one direction of rotation of screw 23. In the preferred construction, the stop abutments 45 are located at 120 degrees intervals. Each pawl 44 includes a plurality of cam portions 46 leading from the high side of one stop abutment 45 back to the low side of the adjacent stop abutment 45.

Located about the pawls 44 and mounted within the housing 30 are a plurality of brake plates 47, each brake plate 47 including a pair of diametrically opposed flanges 50 adapted to be received in slots 51 formed in the housing 30. In the embodiment shown, there are three brake plates 47, one for each pawl 44. The flanges 50 and housing slots 51 are of a size to prevent relative rotation of the brake plates 47 and housing 30 and yet permit lateral shifting of the brake plates 47 upon rotation of the screw 23 and pawls 44 in one direction, as is illustrated in FIG. 5.

Figure 6:
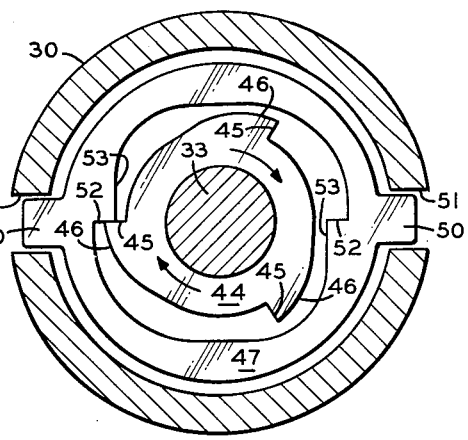
FIG. 6 is a cross sectional view similar to that illustrated in FIG. 5, but showing the position of the component parts when in a locked position.
Figure 8:
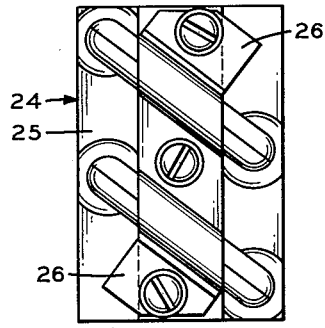
FIG. 8 is a side elevational view of the roller bearing as seen from the left in FIG. 7.
Figure 7:
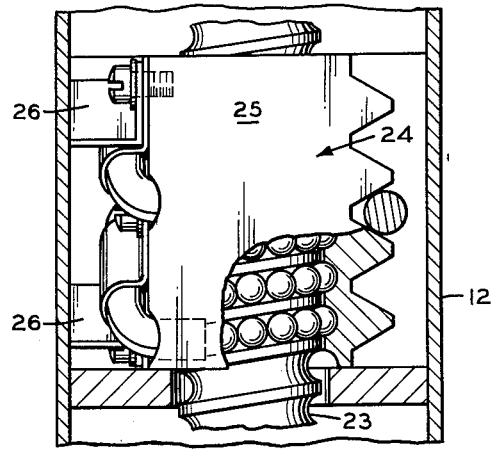
FIG. 7 is an enlarged cross sectional view of the continuous spiral roller bearing as seen along staggered lines 7—7 of FIG. 1.
Figure 9:
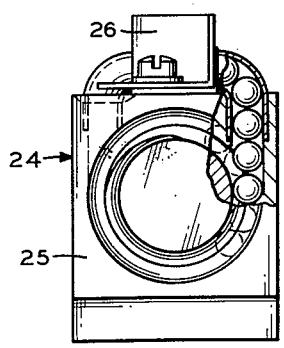
FIG. 9 is a bottom plan view of the roller bearing shown in FIG. 8.

Each brake plate 47 includes a pair of stop shoulders 52 facing in the opposite direction from the pawl abutments 45. It will be noted that the stop shoulders 52 on brake plates 47 are located adjacent the flanges 50 and the housing recesses 51 to provide greater rigidity in the locking action as will be apparent from the later description of parts and operation. Further, each brake plate 47 includes a plurality of cam portions 53 located adjacent the high side of each of the stop shoulders 52. The cam portions 46 of the pawls 44 engage the cam portions 53 of the brake plates 47 during rotation of the pawls 44 and the screw 23 in one direction and reciprocate the brake plates 47 within the housing 30 incident to such rotation. When the pawls 44 and screw 23 are rotated in the opposite direction, as seen in FIG. 6, one of the stop abutments 45 of each pawl 44 will engage one of the stop shoulders 52 of the coacting brake plate 47 to lock the pawls and screw in position and hence prevent further rotation in this direction.

When the leg sections 10 and 12 are in retracted position, the weight of wheels and the slidably movable leg section 12 is supported on the retaining ring 34 by the friction washer 36. As stated above, the frictional force between the friction plate 36 and retaining ring 34 prevents the tendency of the screw 23 to rotate and hence precludes the tendency of leg section 12 to extend.

As the operator turns the drive shaft 15 clockwise by means of a crank, the cross shaft 11 is rotated in a counter-clockwise direction as viewed from the ring in FIG. 1, by the gear train 17 and 20. Consequently, the bevel gear 21 is driven in a counterclockwise direction, and bevel gear 22 is likewise driven in a counterclockwise direction as viewed from the top of FIG. 1. Because the friction washer 36 is sandwiched between the bevel gear 22 and the shoulder 37 of the screw shaft portion 33, the friction washer 36 slips on the surface of retaining ring 34 to permit the rotation of screw 23 and the extension of the leg section 12.

During the counterclockwise rotation of the screw 23, the locking pawls 44 that are fitted between the friction washer 43 and the bearing 31 are allowed to rotate freely because their cam portions 46 engage the cam portions 53 of the brake plates 47 so as to push the brake plates 47 from side-to-side.

The "down-lock" assembly becomes effective after the desired extension of leg section 12 is obtained by the upload pressure on the wheels and hence on the leg section 12. This up-load or retracting pressure on the leg section 12 tends to turn the screw 23 in a clockwise direction. The weight of the trailer represents a down force on the landing gear housing and represents an upload applied on the wheels and leg section 12. Upon application of this up-pressure, the screw shoulder 41 urges the friction washer 43 tightly against the pawls 44, thus providing a drive connection between the screw 23 and pawls 44 so that the pawls 44 rotate therewith.

When the manual turning force is released from the screw 23 incident to extension of leg section 12, and an up-load is exerted on such leg section 12, the tendency will be for the screw 23 to rotate in the opposite direction. Under the conditions set forth above, the pawls 44 will rotate in clockwise direction as viewed from the top in FIGS. 1 and 6 until stop abutments 45 of the pawls 44 engage the stop shoulders 52 of the brake plates 47. This interengagement between the pawls and brake plates precludes further rotation of the screw 23, and hence stops retraction of the leg section 12 under up-load pressure.

To retract the leg section 12 while under a load, the operator rotates the screw 23 in a clockwise direction by means of the gear drive mechanism and thus is able to create more torque on the screw 23 than the friction washer 43 can resist, thereby causing friction washer 43 to slip on the pawls 44 and causing the screw 23 to rotate relative to pawls 44. After the leg section 12 is retracted sufficiently so that it is no longer under an up-load pressure, the friction washer 43 slips on the pawls 44 more easily and enables ready retraction of the leg section 12 to a fully retracted position.

Although the invention has been described by making detailed reference to a single preferred embodiment, such detail is to be understood in an instructive, rather than in any restrictive sense, many variants being possible within the scope of the claims hereunto appended.

I claim as my invention:

1. In a landing gear for trailer, a pair of leg sections telescopically interfitted, a screw extending between and operatively connecting said leg sections, means fixed to one leg section and engaging the screw to be movable along said screw, means rotating said screw for extending and retracting one leg section relative to the other, a housing attached to the other leg section, the screw extending through said housing, a pawl loosely mounted for rotation on said screw, the pawl having an abutment and a cam portion, a brake plate disposed about said pawl, the brake plate having a shoulder adapted to engage the pawl abutment upon rotation of the pawl in one direction and having a cam portion adaped to engage the pawl cam portion upon rotation of the pawl in the other direction, and means mounting said brake plate for lateral shifting movement on said housing precluding rotation of said brake plate at all times upon rotation of the screw in either direction yet permitting lateral shifting movement of said brake plate upon engagement of said cam portions, thereby enabling rotation of the pawl in one direction.

2. In a landing gear for trailer, a pair of leg sections telescopically interfitted, a screw operatively interconnecting said leg sections for extending and retracting the leg sections upon rotation of the screw, a pawl loosely mounted for rotation on said screw, a housing fixed to one leg section, a brake plate disposed about said pawl, the housing including means mounting said brake plate for lateral shifting movement precluding rotation of the brake plate at all times upon rotation of the screw in either direction yet permitting lateral shifting of said brake plate, and means frictionally clamping said pawl between said screw and housing upon exertion of up-load pressure on the leg sections so that said screw tends to rotate said pawl, said pawl engaging said brake plate to lock said screw in one direction upon exertion of such up-load pressure.

3. In a landing gear for trailer, a pair of leg sections telescopically interfitted, a screw operatively interconnecting said leg sections for extending and retracting the leg sections upon rotation of the screw respectively in different directions, a pawl loosely mounted on said screw for rotation thereon, a brake plate disposed about said pawl, means fixed to one leg section and mounting the brake plate for lateral shifting movement precluding rotation of the brake plate at all times upon rotation of the screw in either direction yet permitting lateral shifting of said brake plate, a means on said screw frictionally engaging one side of said pawl, fixed means engaging the other side of said pawl, said screw friction means clamping said pawl upon exertion of up-load pressure on the leg sections so that said screw tends to rotate said pawl, said pawl engaging said brake means to lock said screw in one direction upon exertion of such up-load pressure, and means selectively turning the screw in the direction in which it is normally locked under a torque greater than the friction means can resist, whereby to cause slipping of the friction means on the pawl and cause rotation of the screw relative to the pawl incident to retraction of the leg sections.

4. In a landing gear for trailer, a pair of leg sections telescopically interfitted, a screw operatively interconnecting said leg sections for extending and retracting the leg sections upon rotation of the screw respectively in different directions, a pawl loosely mounted on said screw for rotation thereon, a brake plate disposed about said pawl, means fixed to one leg section and mounting the brake plate for lateral shifting movement precluding rotation of the brake plate at all times upon rotation of the screw in either direction yet permitting lateral shifting of said brake plate, the pawl having an abutment and a cam portion, the brake plate being provided with a shoulder adapted to engage the pawl abutment upon rotation of the pawl in one direction to lock said screw, and provided with a cam portion adapted to engage the pawl cam portion upon rotation of the pawl in the other direction so as to laterally shift the brake plate, means on said screw frictionally engaging one side of said pawl, fixed means engaging the other side of said pawl, said screw friction means clamping said pawl so that said screw tends to rotate said pawl upon exertion of up-load pressure on the leg sections to cause operative engagement of the pawl abutment and brake plate shoulder to lock said screw, and means selectively turning the screw in the direction in which it is normally locked under a torque greater than the friction means can resist, whereby to cause slipping of the friction means on the pawl and cause rotation of the screw relative to the pawl incident to retraction of the leg sections.

5. In a landing gear for trailer, a pair of leg sections telescopically interfitted so that one leg section is extensible and retractible relative to the other leg section, a screw operatively interconnecting said leg sections for extending and retracting the leg sections upon rotation of the screw respectively in different directions, a pawl loosely mounted on said screw for rotation thereon, a housing attached to one of the leg sections, the screw extending through said housing, the pawl having an abutment facing one direction of rotation and a cam portion facing the other direction of rotation, a brake plate disposed about said pawl, the brake plate having a shoulder adapted to engage the pawl abutment upon rotation of the pawl in one direction to lock said screw, and having a cam portion adapted to engage the pawl cam portion upon rotation of the pawl in the other direction, the housing providing slots into which the brake plate is mounted to permit lateral shifting of the brake plate upon engagement of said cam portions, whereby to enable rotation of the pawl in one direction, means on said screw frictionally engaging one side of said pawl, fixed means engaging the other side of said pawl, said screw friction means clamping said pawl upon exertion of up-load pressure on the moveable leg section so that said screw tends to rotate said pawl so as to cause operative engagement of said pawl abutment and brake plate shoulder to lock said screw in one direction upon exertion of such up-load pressure, and means selectively turning the screw in the direction in which it is normally locked under a torque greater than the friction means can resist, whereby to cause slipping of the friction means on the pawl and cause rotation of the screw relative to the pawl incident to retraction of the leg sections.

References Cited in the file of this patent

UNITED STATES PATENTS

| | | |
|---|---|---|
| 1,019,095 | Smythe | Mar. 5, 1912 |
| 2,499,625 | Black | Mar. 7, 1950 |
| 2,550,801 | Geerds | May 1, 1951 |
| 2,655,340 | Dalton | Oct. 13, 1953 |
| 2,756,964 | Hogan | July 31, 1956 |